R. W. McCLELLAND.
Running-Gears.

No. 154,064. Patented Aug. 11, 1874.

Witnesses.
C. T. Brown
J. Whitaker

Inventor
R. W. McClelland
by his Attys.
Hill & Ellsworth

UNITED STATES PATENT OFFICE.

ROBERT W. McCLELLAND, OF CERRO GORDO, ILLINOIS.

IMPROVEMENT IN RUNNING-GEARS.

Specification forming part of Letters Patent No. 154,064, dated August 11, 1874; application filed May 29, 1874.

CASE C.

*To all whom it may concern:*

Be it known that I, ROBERT W. MCCLELLAND, of Cerro Gordo, in the county of Piatt and State of Illinois, have invented certain new and useful Improvements in Lumber-Wagons; and I do hereby declare the following to be a full and exact description of the same, reference being had to the accompanying drawings, forming part of this specification, in which—

Figure 1:
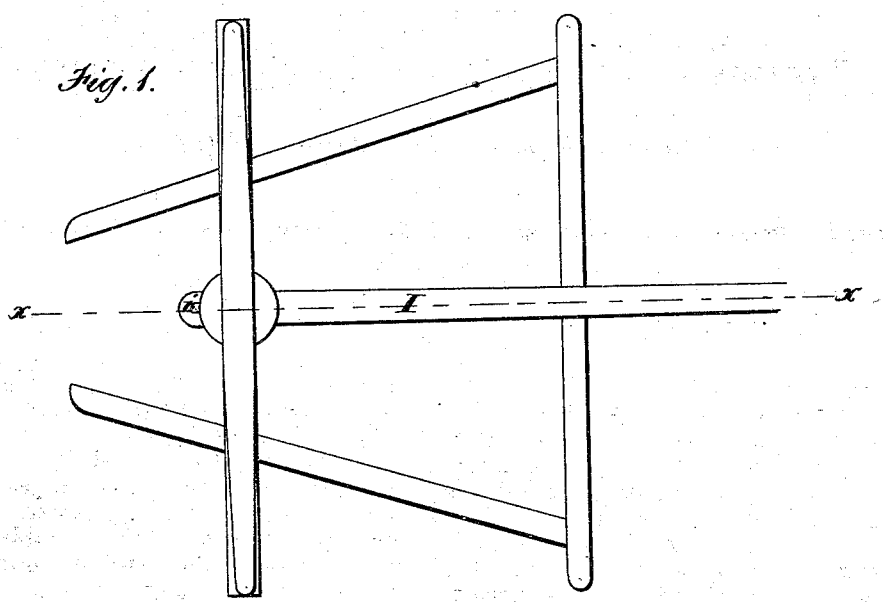
Figure 2:
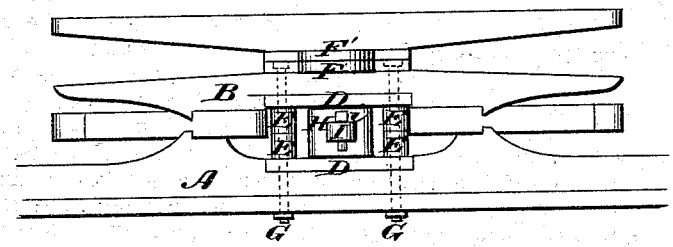
Figure 3:
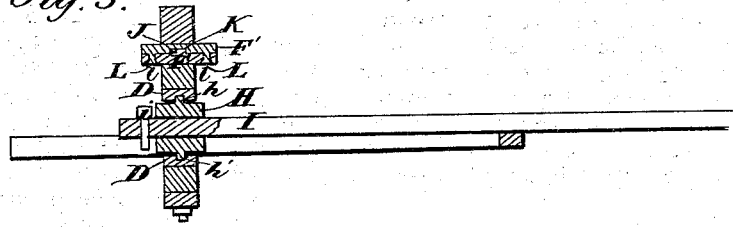
Figure 4:
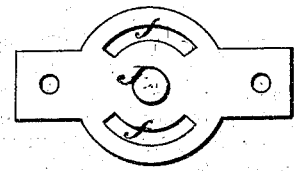

Figure 1 is a top-plan view of my invention; Fig. 2, a front elevation; Fig. 3, a section through line $x$ $x$, Fig. 1; and Fig. 4, a bottom view of one of the lower bolster-plates detached.

Similar letters of reference in the accompanying drawings denote the same parts.

This invention has for its object to improve the construction of that part of the gearing of a lumber or other heavy wagon which pertains to the front axle, sand-board, bolster, and reach or coupling; and to this end it consists, first, in the means employed for connecting the axle and sand-board; secondly, in attaching the coupling or reach to a block pivoted to the axle, or between the axle and sand-board, and adapted to turn horizontally; and, thirdly, in the means employed for connecting the bolster to the sand-board or to the axle, all of which I will now proceed to describe.

In the drawings, A represents the front axle of a lumber or other heavy wagon, and B the sand-board or cross-bar above the axle, between the latter and the bolster. The axle A is provided on its upper side, at the center, with a metallic plate, D, having a vertical tubular projection, E, at each end, the orifices in the projections passing entirely through the plate D, and being continued through the axle. The lower side of the sand-board B has a similar plate, D, with its projections extending downward, and bearing on the upper ends of the projections of the lower plate, as shown in Fig. 2. F represents the lower bolster-plate, attached to the upper side of the sand-board B by bolts G, said bolts passing downward through the sand-board, plates D, and their tubular projections E, and the axle A. The axle and sand-board are thus firmly connected, a space being left between them for the purpose of receiving the block H, which is pivoted to the plates D between the projections E, in such manner as to turn horizontally. The block H is provided with a suitable socket for the reception of the reach or coupling-bar I, which is held in place by a key or pin, $i$, and is thus adapted to swing laterally. The block H is preferably pivoted by means of trunnions $h$ $h'$ on its upper and lower sides, which enter sockets in the plates D, as shown in Fig. 3. The plates D are recessed or countersunk into the sand-board and axle, and are thus kept firmly in place. The lower bolster-plate F is provided with segmental slots $f$ $f$, one on each side of the sand-board, to which it is attached, and has at its center a circular boss, J, concentric with said slots. F' represents the upper bolster-plate, attached to the bolster C, and having a circular recess, K, in its lower side at the center, which fits over the boss J of the plate F. L L are bolts or screws, projecting from the lower side of the plate F', and extending through the segmental slots $f$ of the plate F. The bolts L are provided with heads $l$, which prevent their being drawn through the slots $f$. The plates F F' are thereby prevented from being separated, and are strengthened against lateral strain by the boss J and recess K. The bolts are so arranged as to occupy positions in the centers of the slots $f$, when the bolster and axle are in line with each other, and abut against the ends of said slots, when the bolster is turned sufficiently, thereby checking the turning of the latter.

The devices above described insure the strong connection of the parts and their ready operation. By their use I am enabled to dispense with a king-bolt passing through the front gearing, which weakens and wears away the parts composing said gearing—namely, the axle, sand-board, and bolster.

The plates D hold the pivoted block H of the reach or coupling-bar securely, yet allow it to turn easily.

I claim as my invention—

1. The plates D, having tubular projections E, in combination with the axle and sand-board of a wagon, substantially as described, for the purpose specified.

2. The plates D, applied to the sand-board and axle of a wagon, in combination with the pivoted block H of the reach I, substantially as described, for the purpose specified.

3. The combination of the bolster-plates F F', the former having segmental slots $f$ and circular boss J, and the latter having headed bolts L and recess K, substantially as and for the purpose specified.

ROBT. W. McCLELLAND.

Witnesses:
J. B. RUSSELL,
W. A. McCLINTOCK.